United States Patent [19]
Fisher

[11] Patent Number: 5,577,352
[45] Date of Patent: Nov. 26, 1996

[54] COMPOSITE FRAME MEMBER

[76] Inventor: Larry M. Fisher, 2316 Piedmont Ridge Ct., Marietta, Ga. 30062

[21] Appl. No.: 443,209

[22] Filed: May 17, 1995

[51] Int. Cl.$^6$ .................................................. E04B 1/34
[52] U.S. Cl. ................... 52/74; 52/63; 52/732.1; 52/376; 160/392
[58] Field of Search ................... 52/63, 74, 273, 52/732.1, 376; 160/392

[56] References Cited

U.S. PATENT DOCUMENTS

| | | | |
|---|---|---|---|
| D. 309,351 | 7/1990 | Patsy, Jr. | D25/119 |
| 2,287,667 | 6/1942 | Brown | 156/15 |
| 3,559,357 | 2/1971 | Lowe | 52/282 |
| 3,834,104 | 9/1974 | Dunn et al. | 52/376 |
| 4,193,235 | 3/1980 | Cucchiara | 52/202 |
| 4,272,073 | 6/1981 | Grosser et al. | 52/732.1 X |
| 4,817,655 | 4/1989 | Brooks | 135/101 |
| 4,926,605 | 5/1990 | Milliken et al. | 52/63 |
| 5,044,131 | 9/1991 | Fisher | 52/63 |
| 5,209,029 | 5/1993 | Foerst | 52/63 |
| 5,224,306 | 7/1993 | Cramer | 52/63 |
| 5,237,785 | 8/1993 | Lukes | 52/86 |
| 5,242,004 | 9/1993 | Stilling | 52/63 X |
| 5,291,705 | 12/1994 | Dickerson | 52/732.1 X |
| 5,469,672 | 11/1995 | Fisher | 52/74 |

Primary Examiner—Carl D. Friedman
Assistant Examiner—David J. Jersen
Attorney, Agent, or Firm—Louis T. Isaf, P.C.

[57] ABSTRACT

A composite frame member that includes a longitudinally extending external member that defines a longitudinally extending internal cavity within which a longitudinally extending internal member is disposed. The internal member and external member, while being distinct components, are constructed and arranged to cooperate in a substantially synergistic fashion that seeks to provide a frame member having superior strength characteristics. Further, the internal member and the external member cooperate to define an accessible stapling channel that is capable of being readily stapled into. The external member includes walls that at least partially bound the internal cavity. The internal member is disposed within the internal cavity and defines the stapling channel, wherein the stapling channel receives a cover sheet and staples through an opening defined by the external member. The internal member spans between and abuts certain walls of the external member to uniquely structurally reinforce the external member and thereby provide a composite frame member of considerable strength.

10 Claims, 8 Drawing Sheets

COMPOSITE FRAME MEMBER

BACKGROUND OF THE INVENTION

The present invention relates generally to the field of frame members, and more particularly to the field of frame assemblies that are covered with a cover sheet.

Construction assemblies of the type that include frame assemblies that are covered with a cover sheet are well known and function, for example, as awnings, signs, partitions, and various enclosures. The frame assemblies are constructed of a plurality of frame members. One such type of frame members are elongated and define elongated stapling channels. The cover sheet is often constructed from pieces of fabric composed of woven acrylic or vinyl laminated on a polyester scrim. The cover sheet spans between and is stapled or clipped into the stapling channels of the frame members. Once the cover sheet is stapled into a stapling channel, it is common for an elongated bead or strip to be driven partially into the stapling channel. Representative construction assemblies and frame members are disclosed in U.S. Pat. No. 4,926,605 issued to Milliken et al., as well as numerous other patents.

Frame members are often unitary extrusions of aluminum. Aluminum is a relatively soft metal such that steel staples are capable of being readily stapled into the stapling channels of aluminum frame members. Frame members are also often constructed of steel. However, there are some drawbacks to utilizing steel frame members of the type having conventional stapling channels. For example, steel is a relatively hard metal such that it can be impossible to staple steel stapes into the stapling channels of steel frame members. Any such difficulty in stapling will detrimentally increase the costs associated with the use of steel frame members.

The difficulty of stapling into the stapling channel of steel frame members has, to a limited degree, been addressed. As disclosed in U.S. Pat. No. 4,926,605, it is known to place a strip of nylon or similar material at the bottom of a steel stapling channel such that the strip of nylon is capable of readily receiving staples. While the employment of such a strip of nylon does seek to simplify the process of stapling into the stapling channel of steel frame members, it is otherwise of limited value. For example, such a strip of nylon might tend to become dislodged and does not add any substantial strength to the frame member associated therewith. Further, strips of nylon typically have a characteristic of being somewhat "slick" (e.g., they are not abrasive) such that they are ineffective at retaining staples when the cover sheet is subjected to maximum wind and snow loads. Under such conditions the staples have a tendency to pull out of the nylon strip. The inability of the nylon strips to retain staples is enhanced by the fact that the bottom of the stapling channel of a steel frame member is defined by a steel part upon which a nylon strip rests, whereby staples are precluded from substantially passing through the nylon strip. Further, when steel frame members which include nylon strips are welded, the nylon strips tend to burn or melt such that noxious fumes are emitted. Thus, such steel frame members are often joined with mechanical fittings such as tees or elbows, which are cost prohibitive when compared to welded joints. Additionally, mechanical fittings are less versatile in terms of the configurations in which they can be utilized in connecting frame members. That is, a different style of fitting is needed for different joint scenarios. Also, mechanical fittings typically do not provide joints that are as strong as welded joints.

While aluminum frame members that have stapling channels offer benefits greater than steel frame members having stapling channels (with or without nylon stapling strips), there are numerous short comings to such aluminum frame members. In order for staples to be driven into aluminum stapling channels, aluminum must be of a relatively soft temper; typically a T-5. This material has roughly half the strength characteristics of cold formed steel; a relatively weak form of steel. Also, aluminum is a relatively expensive metal when compared to steel, having a cost approximately twice that of cold formed steel. Due to the combination of the relative weakness and higher unit cost of aluminum, aluminum frame members with aluminum stapling channels are considerably more expensive to produce than their steel counterparts. Further, methods used in welding aluminum are more time consuming and technical in nature than those for welding steel, adding additional expense to construction assemblies that include aluminum frame members. Another potential drawback to the employment of aluminum frame members with stapling channels has to do with the number of times that such frame members are capable of being recovered (recovering being the process of removing a cover sheet from a frame assembly and applying a new cover sheet to that same frame assembly). The number of recoverings is potentially limited because there is a limit to the number of times staples can be driven into and removed from the stapling channel of an aluminum frame member. If staples are repeatedly applied to and removed from the stapling channel, the pan that defines the bottom of the stapling channel will eventually become so perforated that it will not effectively retain staples. This limits the number of times that a given frame assembly is capable of being readily recovered.

There is, therefore, a need in the industry for a method and an apparatus which solve these and other related, and unrelated, problems.

SUMMARY OF THE INVENTION

Briefly described, the preferred embodiment of the present invention comprises a longitudinally extending, composite frame member that defines a longitudinally extending stapling channel. The composite frame member includes a relatively hard, longitudinally extending external member that defines a longitudinally extending internal cavity. A relatively soft, longitudinally extending internal member is disposed within the internal cavity. The internal member and external member, while being distinct components, are constructed and arranged to cooperate in a substantially synergistic fashion such that the frame member has superior strength characteristics. The internal member and the external member further cooperate such that the internal member defines a stapling channel that is capable of being readily stapled into.

In accordance with the most preferred embodiment of the present invention, the external member is constructed of a hard and strong material such as, but not limited to steel. The strength of the steel allows for the construction of very strong frame assemblies which include a minimal number of frame members. The steel is preferably formed such that the external member includes a pair of juxtaposed, longitudinally extending, vertical side walls. The side walls are connected by a longitudinally extending, horizontal bottom wall. The longitudinally extending internal cavity is defined between the side walls and is further bounded by the bottom wall. A pair of longitudinally extending, horizontal upper walls are disposed above the bottom wall and also at least partially bound the internal cavity. Each upper wall extends generally from a respective side wall toward the opposite side wall, and a longitudinally extending opening is defined between the upper walls that provides access to the internal cavity.

The internal member is disposed within the internal cavity and receives the cover sheet and staples through the opening. In accordance with the most preferred embodiment of the present invention, the internal member is constructed of a material that, while strong, is not as hard or strong as the material of the external member. For example and not limitation, the internal member is most preferably an aluminum extrusion. The internal member spans between and abuts certain walls of the external member to uniquely structurally reinforce the external member and thereby provide a composite frame member of considerable strength. Most preferably, the internal member includes a longitudinally extending, lateral member disposed within the internal cavity. Opposite ends of the lateral member abut the side walls of the external member in a manner that seeks to preclude the collapsing of the internal cavity. The internal member further includes a pair of juxtaposed, longitudinally extending, vertical upright members that extend upward from the lateral member. The upper terminus of each upright member abuts a respective upper wall of the external member and thereby seeks to maintain the configuration of the internal cavity, the stapling channel, and the opening to the stapling channel. The longitudinally extending stapling channel is defined between the pair of upright members and is further bounded by the lateral member. The stapling channel is in communication with and receives the cover sheet and staples through the opening of the external member.

It is therefore an object of the present invention to provide a composite frame member.

Another object of the present invention is to provide a method of fabricating a composite frame member.

Yet another object of the present invention is to provide a frame member that incorporates the advantages of two distinctly different materials.

Still another object of the present invention is to provide a stronger frame member.

Still another object of the present invention is to provide a reinforced frame member Still another object of the present invention is to provide a multipurpose internal member that inserts into an external member to both reinforce the external member and facilitate the attachment of a cover sheet to the external member.

Still another object of the present invention is to provide an improved frame member so that construction assemblies can include less frame members.

Still another object of the present invention is to decrease the cost of frame members and thereby decrease the cost of construction assemblies.

Still another object of the present invention is to decrease the amount of time required for the building of frame assemblies.

Other objects, features and advantages of the present invention will become apparent upon reading and understanding this specification, taken in conjunction with the accompanying drawings.

DETAILED DESCRIPTION OF THE PREFERRED EMBODIMENT

Figure 1:
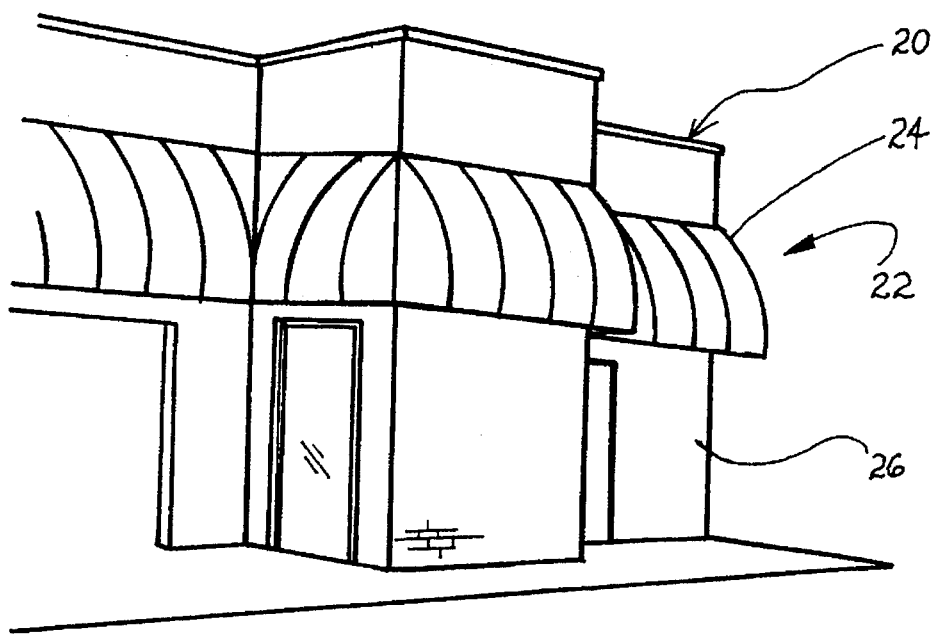
FIG. 1 is a perspective view of a building with an exemplary construction assembly, in the form of an awning, attached thereto, in accordance with the preferred embodiment of the present invention.
Figure 2:
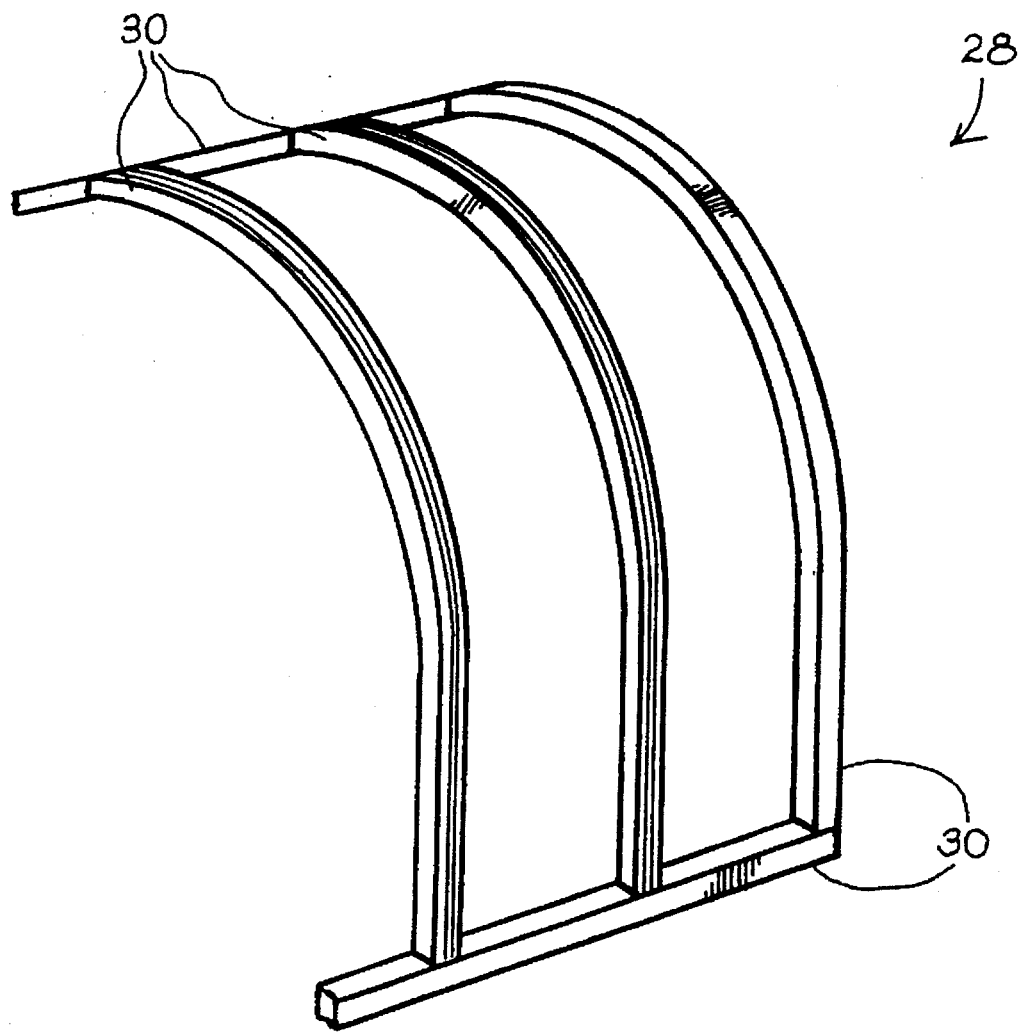
FIG. 2 is an isolated, cut-away, perspective view of a frame assembly of the construction assembly of FIG. 1, in accordance with the preferred embodiment of the present invention.

Referring now in greater detail to the drawings, in which like numerals represent like components throughout the several views, FIG. 1 is a perspective view of a building 20 with a construction assembly 22 attached thereto. The construction assembly 22 depicted in FIG. 1 is in the form of an awning; however, a wide variety of constructions assemblies such as, but not limited to, signs, partitions, and various enclosures, are also within the scope of the present invention. In accordance with the preferred embodiment of the present invention, the construction assembly 22 includes a cover sheet 24 and is connected to a wall 26 of the building 20. The cover sheet 24 is preferably a flexible covering material constructed, for example and not limitation, from pieces of fabric, such as polyester or acrylic. FIG. 2 is an isolated, cut-away, perspective view of a frame assembly 28 portion of the construction assembly 22 of FIG. 1, in accordance with the preferred embodiment of the present invention. The frame assembly 28 is preferably constructed from a plurality of elongated frame members 30 that are connected. The cover sheet 24 spans between and attaches to the frame members 30.

Figure 3:
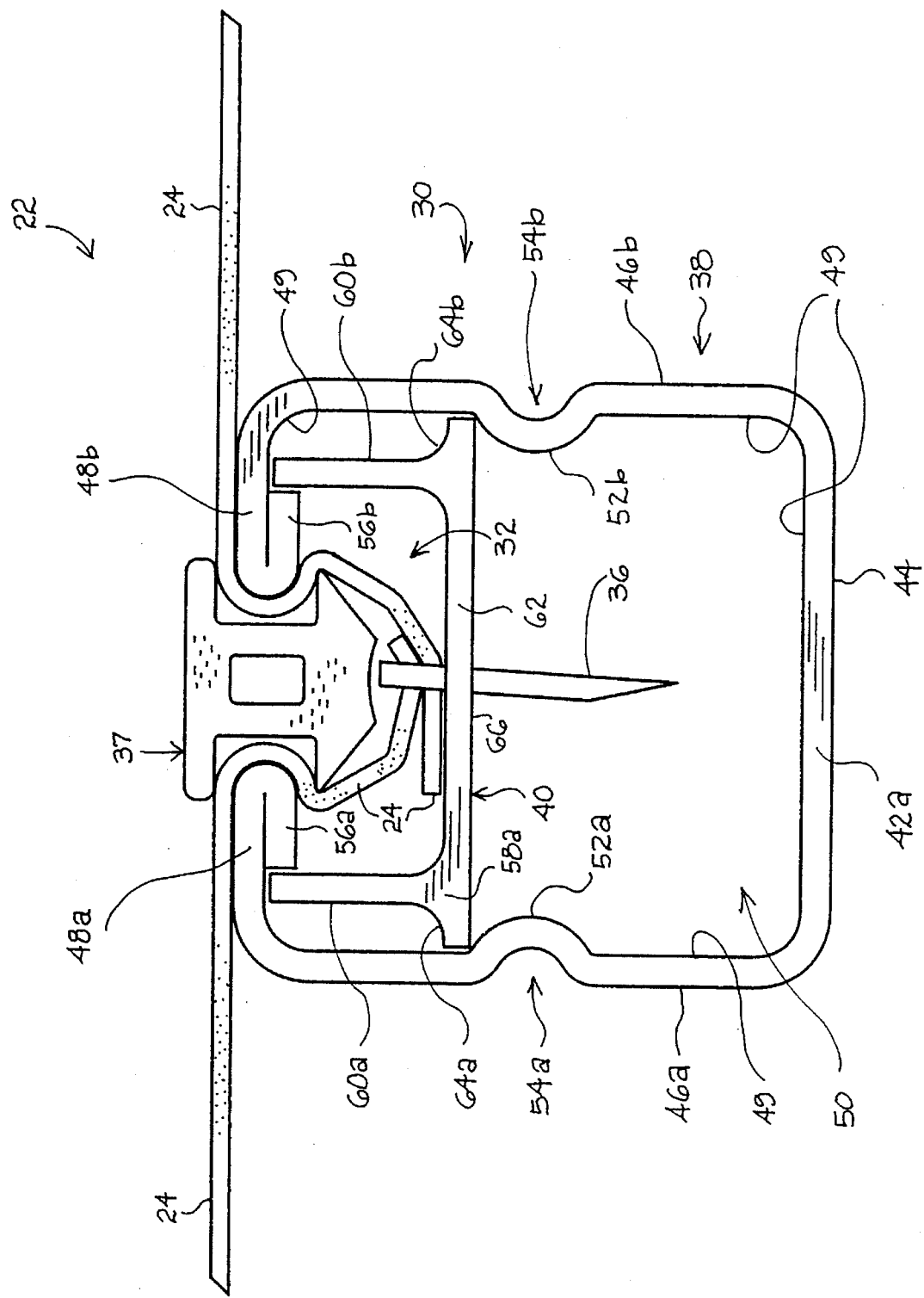
FIG. 3 is an end elevational view of an isolated portion of the construction assembly of FIG. 1, wherein an end elevational view of a segment of a frame member is depicted with portions of other construction assembly components attached thereto, in accordance with the preferred embodiment of the present invention.

FIG. 3 is an end elevational view of an isolated portion of the construction assembly 22, wherein an end elevational view of a representative segment of a representative frame member 30 is depicted. The frame member 30 is central to the inventive aspects of the present invention. In accordance with the preferred embodiment of the present invention, the frame member 30 defines an elongated stapling channel 32 into which portions of the cover sheet 24 are attached by piercing members such as, but not limited to, staples 36. Once the cover sheet 24 and staples 36 are applied to the stapling channel 32, the stapling channel 32 is preferably occluded by an elongated bead or strip member 37 that is driven partially into the stapling channel 32. The strip member 37 functions, for example, to keep moisture out of the stapling channel 32, make the cover sheet 24 taught, and enhance the appearance of the construction assembly 22.

As mentioned above, the frame member 30 is central to the inventive aspects of the present invention. In accordance with the preferred embodiment of the present invention, the frame member 30 includes a longitudinally extending external member 38 that houses a longitudinally extending internal member 40. In accordance with the preferred embodiment of the present invention, and as will be discussed in greater detail below, the external member 38 is preferably constructed of material that is too hard to readily receive steel staples 36, while the internal member is preferably constructed of a softer material that is capable of readily receiving steel staples 36. The external member 38 preferably functions as a structural member having a high yield strength, while the internal member 40 functions as a structural member that reinforces the external member 38 and is capable of readily receiving staples 36, or the like. More specifically, and as will be discussed in greater detail below, the members 38,40 are constructed and arranged such that they cooperate in a synergistic fashion that seeks to maintain the overall shape of the frame member 30.

Refer also to FIGS. 4–7 which are various isolated end, top, side, and bottom views, respectively, of the external member 38 of FIG. 3. The external member 38 includes opposite ends 42a,b, between which the length of the external member 38 is defined. The external member 38 is preferably uniform along its length. A pair of side walls 46a, b extend upward from a bottom wall 44, and a pair of upper walls 48a, b extend toward one another from the upper end of the side walls 44a, b, respectively. Each of the walls 44, 46a, b, 48a, b extend longitudinally between the opposite ends 42a, b. Additionally, the walls 44, 46a, b, 48a, b cooperate to partially bound and define a internal cavity 50 that extends longitudinally between and is open at the opposite ends 42a, b. Stated differently, the external member 38 includes an internal surface 49 that partially bounds and defines the internal cavity 50. Additionally, an opening 51 is defined between the upper walls 48a, b and extends between the opposite ends 42a, b. The opening 51 provides access to the internal cavity 50 and the cover sheet 24 and the staples 36 are preferably passed through the opening 51 to achieve their ultimate position within the internal cavity 50. The side walls 46a,b define longitudinally extending side protrusions 52a,b, respectively, that protrude into the internal cavity 50 and form longitudinally extending recesses 54a, b, respectively. The recesses 54a,b function, for example, to receive additional welding material in a manner that facilitates the attachment of frame members 30 to one another as well as to other structures. The upper walls 48a, b define upper protrusions 56a, b, respectively, that protrude into the internal cavity 50 and define edges 57a,b (FIG. 4), respectively, that face away from the opening 51. Each of the protrusions 52a, b, 56a, b extend longitudinally between the opposite ends 42a, b.

Figure 4:
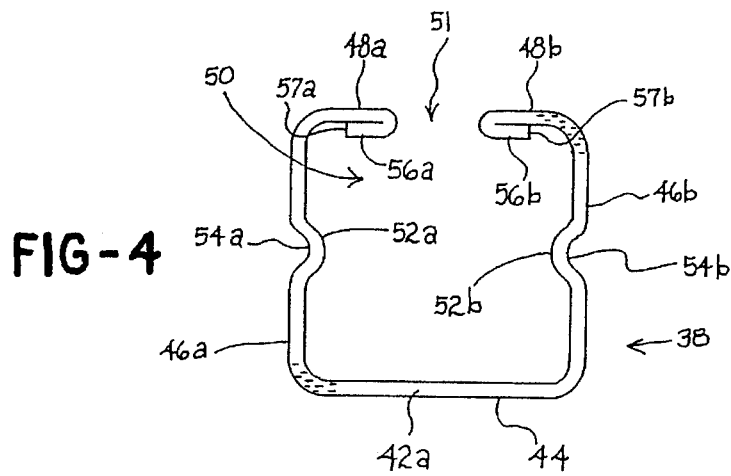
FIG. 4 is an isolated, end elevational view of an external member of the frame member of FIG. 3, the end opposite being a mirror image, in accordance with the preferred embodiment of the present invention.
Figure 5:
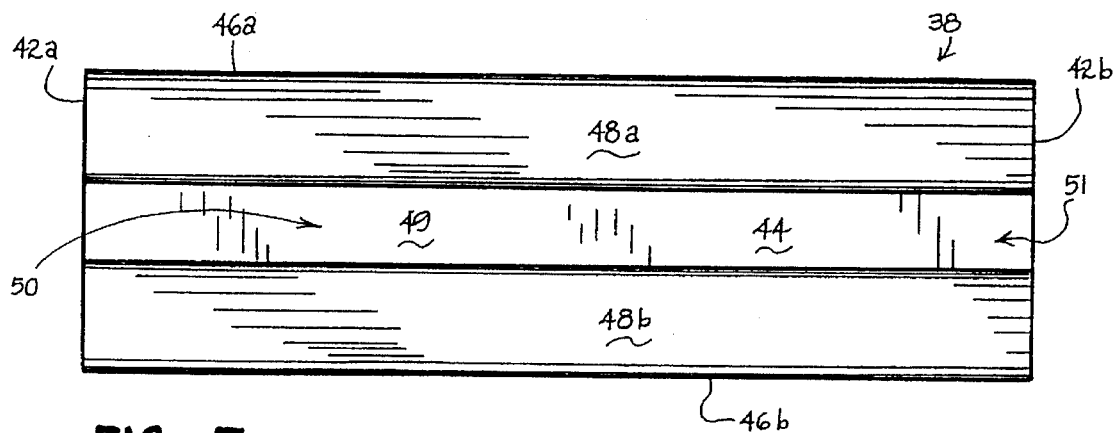
FIG. 5 is an isolated, top plan view of the external member of FIG. 4.
Figure 6:
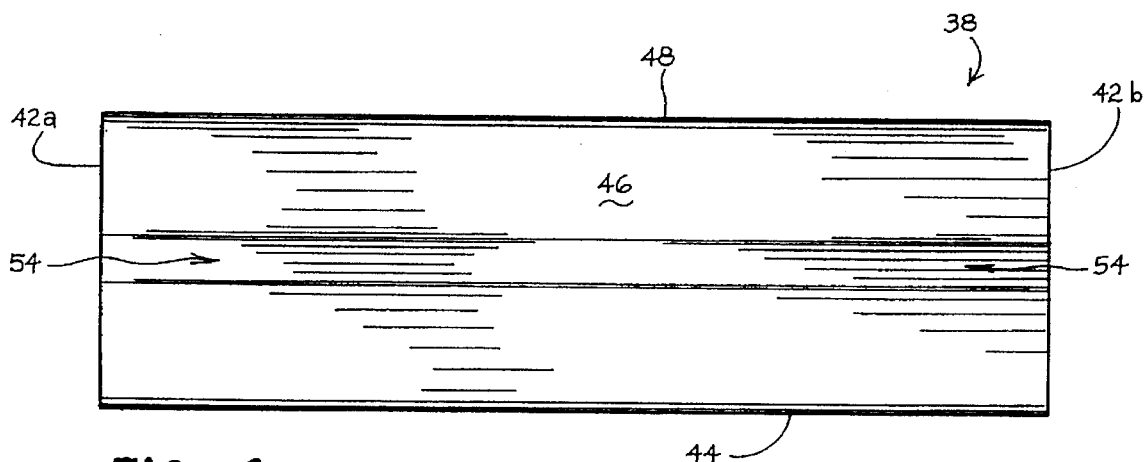
FIG. 6 is an isolated, side elevational view of the external member of FIG. 4, the side opposite being a mirror image.
Figure 7:
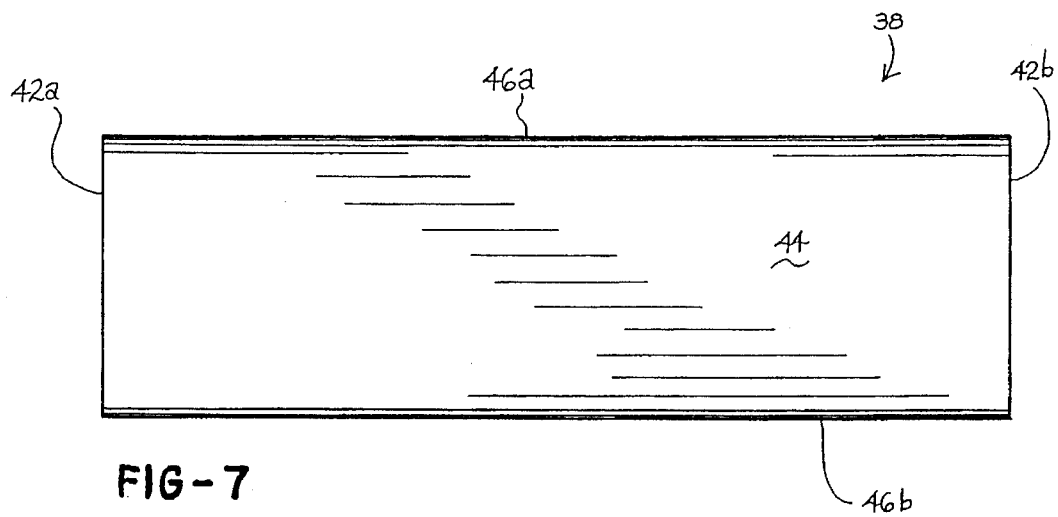
FIG. 7 is an isolated, top plan view of the external member of FIG. 4.
Figure 8:
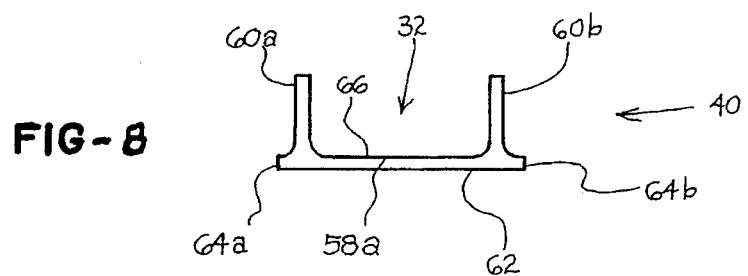
FIG. 8 is an isolated, end elevational view of an internal member of the frame member of FIG. 3, the end opposite being a mirror image, in accordance with the preferred embodiment of the present invention.
Figure 9:
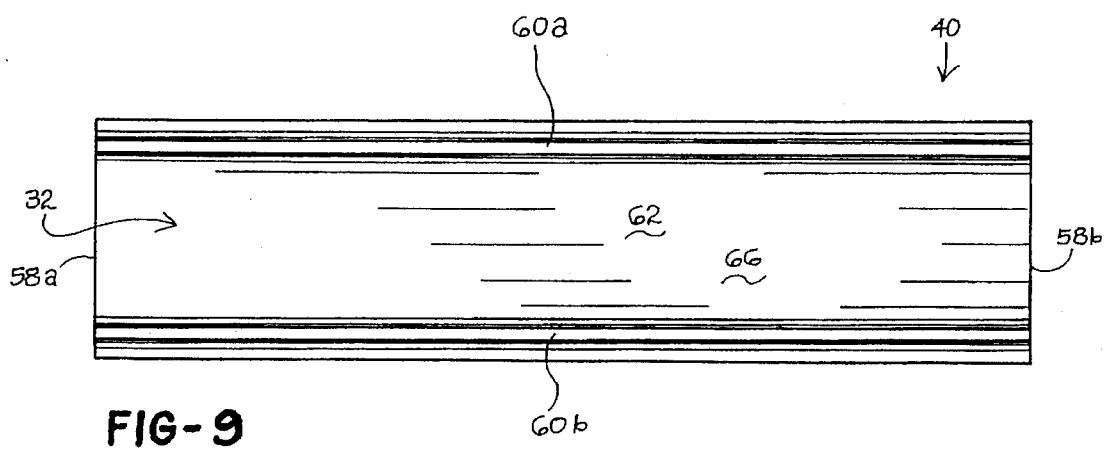
FIG. 9 is an isolated, top plan view of the internal member of FIG. 8.
Figure 10:
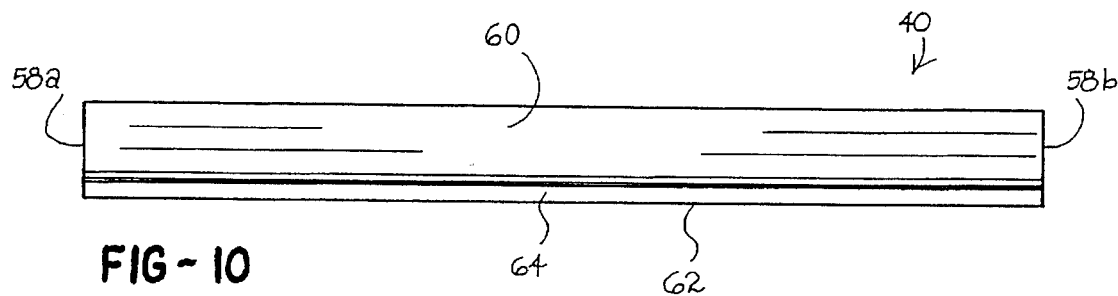
FIG. 10 is an isolated, side elevational view of the internal member of FIG. 8, the side opposite being a mirror image.
Figure 11:
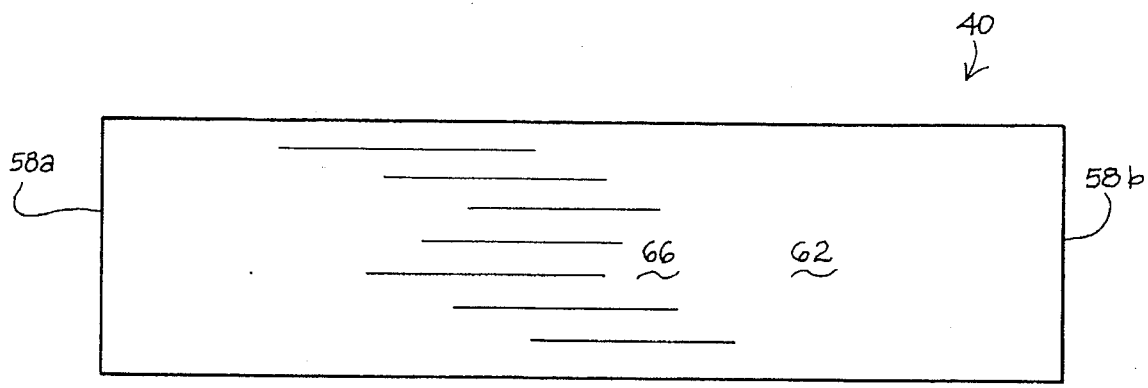
FIG. 11 is an isolated, bottom plan view of the internal member of FIG. 8.

Refer now to FIG. 3 and additionally to FIGS. 8–11 which are isolated end, top, side, and bottom views, respectively, of the internal member 40 of FIG. 3. The internal member 40 includes opposite ends 58a,b, between which the length of the internal member 40 is defined. The internal member 40 is preferably uniform along its length. A pair of longitudinally extending upright members 60a, b extend upward from a longitudinally extending lateral member 62 and terminate at a position proximate to (i.e., contacting or close to) the upper protrusions 56a, b, respectively. Referring momentarily also to FIG. 4, the upper terminus of the upright member 60a is preferably proximate to (i.e., contacting or close to) the underside of the upper wall 48a and the edge 57a of the upper protrusions 56a; and the upper terminus of the upright member 60b preferably abuts (or nearly abuts) the underside of the upper wall 48b and the edge 57b of the upper protrusions 56b. The stapling channel 32 is at least partially bound and defined by the lateral member 62 and upright members 60a, b. The lateral member 62 includes opposite sides 64a, b that are proximate to (i.e., contacting or close to) the side protrusions 52a, b, respectively. Most preferably, the bottom edges of the opposite sides 64a,b rest upon upper shoulders of the side protrusions 52a, b, respectively, along the entire length of the frame member 30 such that the internal member 40 is suspended within the internal cavity 50. The lateral member 63 further includes a midspan 66 between the upright members 60a, b that preferably receives the staples 36.

Figure 12:
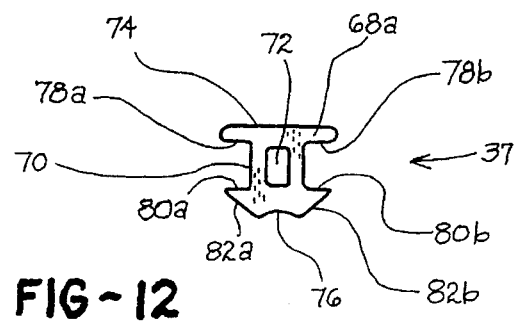
FIG. 12 is an isolated, end elevational view of a segment of a strip member depicted in FIG. 3, the end opposite being a mirror image, in accordance with the preferred embodiment of the present invention.
Figure 13:
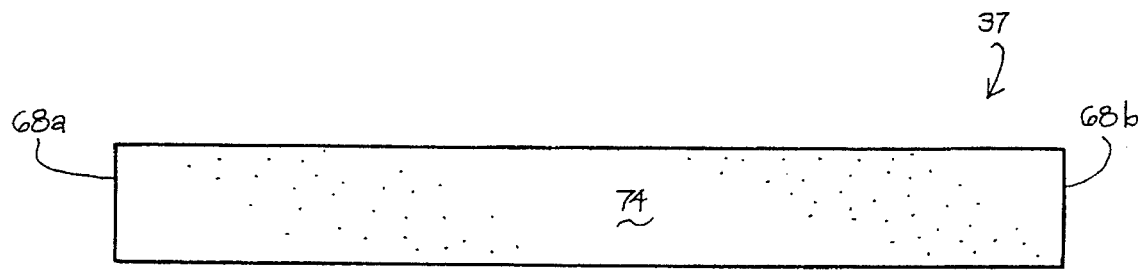
FIG. 13 is an isolated, top plan view of the strip member of FIG. 12.
Figure 14:
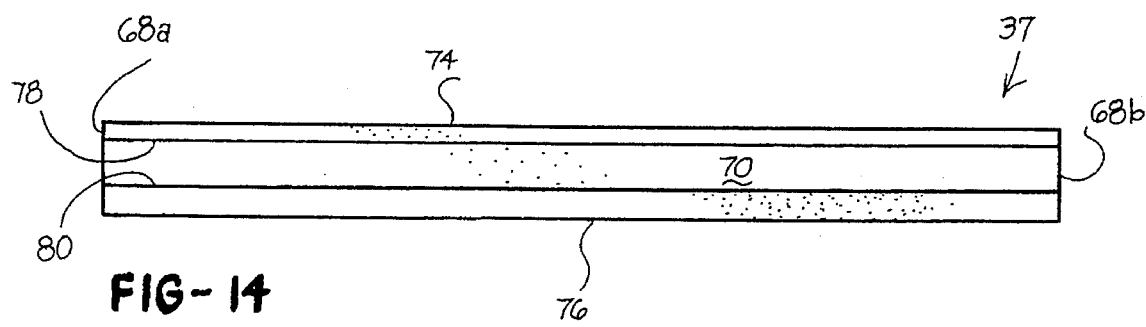
FIG. 14 is an isolated, side elevational view of the strip member of FIG. 12, the side opposite being a mirror image.
Figure 15:
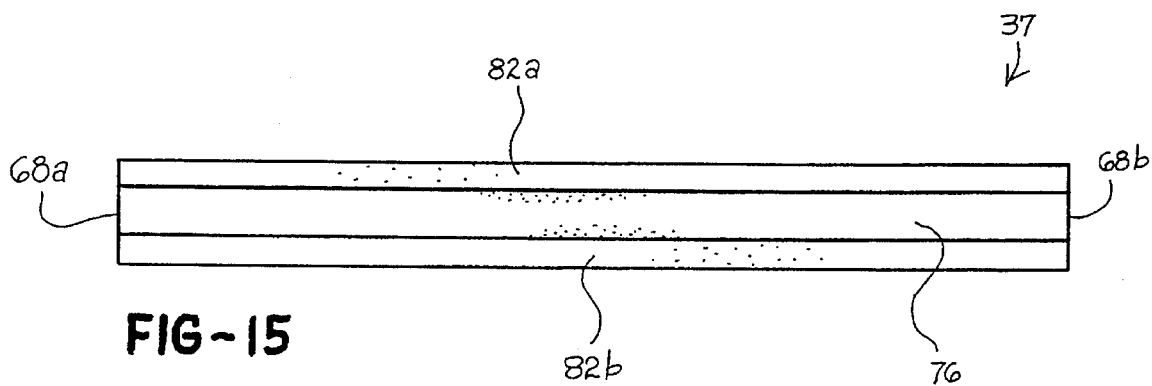
FIG. 15 is an isolated, bottom plan view of the strip member of FIG. 12.

Refer now primarily to FIG. 12 and additionally to FIGS. 3 and 13–15. FIGS. 12–15 are isolated end, top, side and bottom views, respectively, of a representative segment of the strip member 37 of FIG. 3. The strip member 37 includes opposite ends 68a, b (FIGS. 13–15) between which the length of the strip member 37 is defined. The strip member 37 is preferably uniform along its length. The strip member includes a central shank 70 that defines a longitudinally extending passage 72 that is open at the ends 68a, b. An upper flange member 74 extends from the top of the shank 70 and a lower flange member 76 extends from the bottom of the shank 70. The upper flange member 74 defines upper shoulders 78a, b, and the lower flange member 76 defines lower shoulders 80a, b that face the upper shoulders 78a, b, respectively. The strip member 37 is preferably flexible and resilient such that the upper shoulder 78a and lower shoulder 80a cooperate to define a void therebetween that releasably receives the upper wall 48a (FIG. 3 ) and the upper protrusion 56a (FIG. 3); and the upper shoulder 78b and lower shoulder 80b cooperate to define a void therebetween that releasably receives the upper wall 48b (FIG. 3 ) and the upper protrusion 56b (FIG. 3 ). The lower flange member 76 further includes angled faces 82a, b that function to promote the insertion of the strip member 37 partially into the stapling channel 32.

Referring back to FIG. 3, as mentioned above, in accordance with the preferred embodiment of the present invention, the external member 38 is preferably constructed of material that is generally too hard to readily receive steel staples 36, while the internal member is preferably constructed of a material that is sufficiently soft to readily receive steel staples 36. For example, the external member 38 is preferably constructed of a hard and strong material such as, but not limited to, steel. In accordance with the preferred embodiment of the present invention, the internal member 40 is constructed of a material that is rigid enough to structurally reinforce the external member 38, is soft enough to readily receive the staples 36, and is abrasive enough to engage (i.e., hold on to) the staples 36. In accordance with the preferred embodiment of the present invention, the internal member 40 is constructed of a material such as, but not limited to, aluminum. In accordance with that example, the external member 38 preferably has a higher yield strength than the internal member 40. Most particularly, the steel of the external member 38 is preferably galvanized; and alternately the steel is covered with a plastic coating or painted. In accordance with alternate embodiments of the present invention, the internal member 40 is constructed of materials such as, but not limited to, a material sold under the trademark DELRIN, carbon composite materials, or fiberglass.

Figure 16:
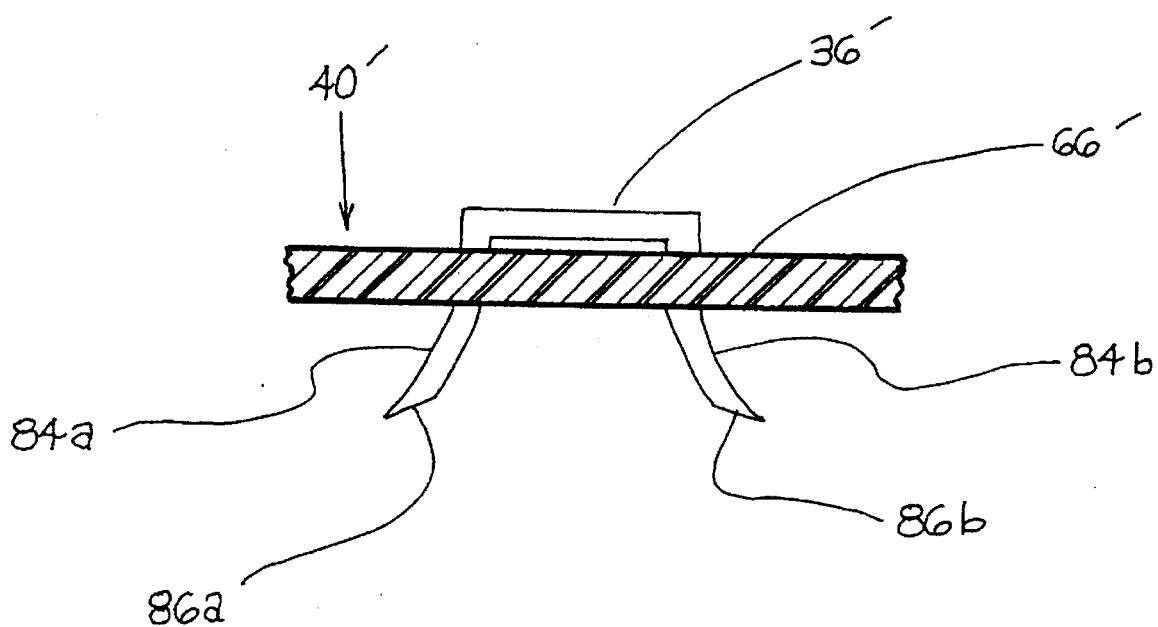
FIG. 16 is a side, partial cross-sectional, cut-away view of a portion of an internal member engaging a staple, in accordance with an alternate embodiment of the present invention.

In accordance with other alternate embodiments of the present invention, the internal member 40 is constructed of plastics such as, but not limited to, nylon. FIG. 16 is a side cross-sectional, cut-away view of a portion of a plastic internal member 40', in accordance with an alternate embodiment of the present invention. The staple 36' depicted in FIG. 16 includes prongs 84a, b which tend to diverge upon passing through a member such as, but not limited to, the midspan 66' of the internal member 40'. Referring momentarily back to FIG. 3, an important feature of the preferred and certain alternate embodiments of the present invention is that the bottom side of the midspan 66 portion of the internal member 40 is displaced from the external member 38. This enhances the effectiveness of the stapled 36,36'. More particularly, this enhances the effectiveness of the staple 36' by virtue of the fact that the tips of the prongs 84a, b are capable of passing completely through and extending divergently from the midspan 66' of the internal member 40', as depicted in FIG. 16. The divergent nature of the prongs 84a, b is acceptably facilitated, for example and not limitation, by oppositely angled faces 86a, b defined proximate to the tips of the prongs 84a, b respectively. As the angled faces 86a, b are forced through the midspan 66', the angled faces 86a,b contact the material of the midspan 66' such that the tips of the prongs 84a, b are forced away from each other, whereby the staple 36' "locks" to the internal member 40'.

In accordance with the preferred embodiment of the present invention, the external member 38 is preferably formed from a longitudinally extending, generally planar strip of steel. The strip of steel is bent into the shape of the external member 38. For example, the opposite edges of the strip of steel are preferably "doubled over" to form the upper protrusions 56a,b. In accordance with one acceptable example, the external member 38 is formed by continuously feeding a longitudinally extending strip of steel into one end of a "staged" press such that an external member 38 continuously flows out of the opposite end of the press. As the strip passes through the press it is successively acted on by a plurality of hardened rolling dies. In other words, the press includes a series of dies, and a given segment of the strip encounters one set of dies after another until it finally exits the press in the form of the external member 38. As the external member 38 exits the press it is preferably automatically cut into appropriate lengths.

In accordance with the preferred embodiment of the present invention, the internal member 40 is preferably extruded. After both the external member 38 and the internal member 40 are formed, it is preferable to insert the internal member 40 into the internal cavity 50 of the external member 38 from an end 42 of the external member 38, whereby the frame member 30 is created. So constructed frame members 30 are capable of being various lengths, however it might be preferable to initially fabricate the frame members 30 in thirty foot lengths.

As mentioned previously, there is, at least theoretically, some limit to the number of times that staples 36 can be driven into the stapling channel of an aluminum frame member (not shown). If staples 36 are repeatedly applied to and remove from the stapling channel, the member that defines the bottom of the stapling channel will eventually become so perforated that it will not effectively retain staples 36. The present invention overcomes such a problem by virtue of the fact that, if desirable, under certain conditions an "overly perforated" internal member 40 can be withdrawn from the internal cavity 50 of an external member 38 and replaced with a new internal member 40.

Referring further to FIG. 3, once a frame member 30 is created, it will often be desirable to shape the frame member 30 by bending or cutting it. As an example, certain of the frame members 30 depicted in FIG. 2 are bent. During any such bending or other shaping, the external member 38 and internal member 40 synergistically cooperate in a manner that seeks to maintain the general structural shape of the frame member 30. For example, by virtue of the fact that the lateral member 62 of the internal member 40 is suspended within the internal cavity 50 and spans between the side walls 46a,b, the lateral member 62 seeks to maintain the distance between the side walls 46a,b such that they do not collapse into the internal cavity. As a further example, the tops of the upright members 60a, b abut the upper protrusions 56a, b, respectively, in a manner that seeks to keep the side walls 46a,b from spreading away from each other. This cooperation seeks to maintain the shape of the opening 51 (FIG. 4) and the internal cavity 50. The cooperation between the upright members 60a,b and the upper protrusions 56a, b further seeks to keep the upright members 60a,b from collapsing into the stapling channel 32, whereby the integrity of the stapling channel 32 is maintained. Also, the tops of the upright members 60a, b abut the underside of the upper walls 48a, b, respectively, in a manner that seeks to keep the upper walls 48a, b from collapsing into the stapling channel 32 or internal cavity 50.

In accordance with the preferred embodiment of the present invention, the strip member 37 is preferably formed from a single extruded piece of a suitable plastic material, such as, for example, polyvinyl chloride. For aesthetic purposes, the strip member 37 is often made to be the same color as the cover sheet 24 with which it will be used.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative relationships shown on the drawings are given as the preferred relative relationships, but the scope of the invention is not to be limited thereby.

I claim:

1. A composite frame member to which a cover sheet is attached by a plurality of piercing members, the composite frame member comprising:

a longitudinal extending external member,
   wherein said external member includes an internal surface that at least partially bounds and defines a longitudinally extending internal cavity,
   wherein said external member further defines a longitudinally extending opening that is configured to receive at least a portion of the cover sheet and the plurality of piercing members, and
   wherein said external member is constructed of a first material having a first hardness; and
a longitudinally extending internal member disposed within said internal cavity and structurally reinforcing said external member,
   wherein said internal member is readily accessible through said opening and is constructed and arranged to engage the plurality of piercing members in a manner that attaches the cover sheet to said internal member,
   wherein said internal member is constructed of a second material that is distinct from said first material and has a second hardness that is less than said first hardness, whereby said external member is distinct from said internal member,
   wherein said internal member includes
      a longitudinally extending first member,
      a longitudinally extending second member extending away from said first member, and
      a longitudinally extending third member also extending away from said first member, and
   wherein a longitudinally extending channel that is readily accessible through said opening is defined between said first member, said second member, and said third member.

2. The composite frame member of claim 1,
wherein said first member is proximate to a first portion of said internal surface,
wherein said second member is proximate to a second portion of said internal surface that is distant from said first portion, and
wherein said third member is proximate to a third portion of said internal surface that is distant from both said second portion and said first portion,
whereby said internal member reinforces said external member.

3. The composite frame member of claim 1,
wherein said external member defines a length,
wherein said opening extends for substantially the entire length of said external member, and
wherein said channel is accessible through said opening for substantially the entire length of said external member.

4. A composite frame member to which a cover sheet is attached by a plurality of piercing members, the composite frame member comprising:
a longitudinally extending external member,
   wherein said external member includes
      an internal surface that at least partially bounds and defines a longitudinally extending internal cavity,
      a pair of side walls including
         a longitudinally extending first side wall, and
         a longitudinally extending second side wall distant from said first side wall, and
      a pair of top walls including
         a longitudinally extending first upper wall connected to said first side wall and extending toward said second side wall, said first upper wall including a first upper protrusion depending therefrom, and
         a longitudinally extending second upper wall connected to said second side wall extending toward said first side wall, said second upper wall including a second upper protrusion depending therefrom,
   wherein said internal cavity is at least partially defined between said first side wall and said second side wall,
   wherein said first side wall includes a first side protrusion extending toward said second side wall,
   wherein said second side wall includes a second side protrusion extending toward said first side wall,
   wherein said external member further defines a longitudinally extending opening, and
   wherein said external member is constructed of a first material having a first hardness; and
a longitudinally extending internal member disposed within said internal cavity and structurally reinforcing said external member,
   wherein said internal member spans between said first side wall and said second side wall in a manner that seeks to preclude movement of said first side wall toward said second side wall,
   wherein said first side protrusion and said second side protrusion abut said internal member to at least partially position said internal member within said internal cavity,
   wherein said first upper protrusion and said second upper protrusion are proximate to said internal member and thereby at least partially position said internal member within said internal cavity,
   wherein said internal member is readily accessible through said opening, and
   wherein said internal member is constructed of a second material that is distinct from said first material and has a second hardness that is less than said first hardness,
   whereby said external member is distinct from said internal member.

5. The composite frame member of claim 4,
wherein said internal member includes
   a longitudinally extending lateral member including
      a first side situated upon to said first side protrusion,
      a second side opposite from said first side and situated upon said second side protrusion, and
      a midspan interposed between said first side and said second side and accessible through said opening,
   a longitudinally extending first upright member extending upward from said lateral member to a position proximate to said first upper protrusion, and
   a longitudinally extending second upright member extending upward from said lateral member to a position proximate to said second upper protrusion, and
wherein said channel is defined between said lateral member, said first upright member, and said second upright member.

6. The composite frame member of claim 5,
wherein said external member further includes a bottom wall connected between said pair of side walls and disposed below said internal member,
wherein said midspan of said internal member is interposed between said first upright member and said second upright member of said internal member, wherein said channel of said internal member is configured to receive at least a portion of the cover sheet and the plurality of piercing members, and wherein said midspan of said internal member is constructed and arranged to engage the plurality of piercing members in a manner that attaches the cover sheet to said midspan.

7. A construction assembly comprising:

a composite frame member including
a longitudinally extending external member,
wherein said external member at least partially bounds and defines a longitudinally extending internal cavity,
wherein said external member further defines an accessible longitudinally extending opening, and
wherein said external member is constructed of a first material having a first hardness, and
a longitudinally extending internal member disposed within said internal cavity and structurally reinforcing said external member,
wherein said internal member is readily accessible through said opening, and
wherein said internal member is constructed of a second material that is distinct from said first material and has a second hardness that is less than said first hardness,
whereby said internal member is distinct from said external member;

a cover sheet extending through said opening and at least partially disposed within said internal cavity;

a plurality of piercing members disposed at least partially within said internal cavity and connecting said cover sheet to said internal member; and a laterally extending strip member fixed into and substantially occluding said opening.

8. A construction assembly comprising:

a first composite frame member including
a longitudinally extending first external member,
wherein said first external member at least partially bounds and defines a longitudinally extending first internal cavity,
wherein said first external member further defines an accessible longitudinally extending first opening, and
wherein said first external member is constructed of a first material having a first hardness, and
a longitudinally extending first internal member disposed within said first internal cavity and structurally reinforcing said first external member,
wherein said first internal member is readily accessible through said opening, and
wherein said first internal member is constructed of a second material that is distinct from said first material and has a second hardness that is less than said first hardness,
whereby said first internal member is distinct from said first external member;

a cover sheet extending through said first opening and at least partially disposed within said first internal cavity;

a first plurality of piercing members disposed at least partially within said first internal cavity and connecting said cover sheet to said first internal member; and a second composite frame member including
a longitudinally extending second external member,
wherein said second external member at least partially bounds and defines a longitudinally extending second internal cavity,
wherein said second external member further defines an accessible longitudinally extending second opening, and
wherein said second external member is constructed of said first material, and
a longitudinally extending second internal member disposed within said second internal cavity and readily accessible through said second opening,
wherein said second internal member is constructed of said second material that is distinct from said first material,
wherein said cover sheet extends from said first internal member to said second composite frame member, and
wherein said cover sheet is at least partially disposed within said second opening;

and a second plurality of piercing members disposed at least partially within said second internal cavity and connecting said cover sheet to said second internal member.

9. A construction assembly comprising:

a composite frame member including
a longitudinally extending external member,
wherein said external member includes an internal surface that at least partially bounds and defines a longitudinally extending internal cavity,
wherein said external member further defines an accessible longitudinally extending opening, and
wherein said external member is constructed of a first material having a first hardness, and
a longitudinally extending internal member disposed within said internal cavity and structurally reinforcing said external member,
wherein said internal member includes a longitudinally extending lateral member including
a first side situated proximate to said internal surface,
a second side opposite from said first side and proximate to said internal surface, and
a midspan interposed between said first side and said second side and accessible through said opening,
a longitudinally extending first upright member extending upward from said lateral member to a position proximate to said internal surface, and
a longitudinally extending second upright member extending upward from said lateral member to a position proximate to said internal surface,
wherein a longitudinally extending channel that is readily accessible through said opening is defined between said lateral member, said first upright member, and said second upright member, and
wherein said internal member is constructed of a second material that is distinct from said first material and has a second hardness that is less than said first hardness,
whereby said internal member is distinct from said external member;

a cover sheet extending through said opening and at least partially disposed within said channel and said internal cavity; and a plurality of piercing members disposed at least partially within said channel and said internal cavity and connecting said cover sheet to said internal member, wherein said plurality of piercing members engage said internal member in a manner that attaches said cover sheet to said internal member.

10. A construction assembly comprising:

a composite frame member including a longitudinally extending external member, wherein said external member at least partially bounds and defines a longitudinally extending internal cavity, wherein said external member further defines an accessible longitudinally extending opening, wherein said external member is constructed of a first material having a first hardness, and wherein said external member includes a pair of side walls including a longitudinally extending first side wall, and a longitudinally extending second side wall distant from said first side wall, wherein said first side wall includes a first side protrusion extending toward said second side wall, wherein said second side wall includes a second side protrusion extending toward said first side wall, wherein said internal cavity is disposed between said first side wall and said second side wall, and wherein said external member further includes a pair of top walls including a longitudinally extending first upper wall connected to said first side wall and extending toward said second side wall, said first upper wall including a first upper protrusion depending therefrom, and a longitudinally extending second upper wall connected to said second side wall and extending toward said first side wall, said second upper wall including a second upper protrusion depending therefrom; and a longitudinally extending internal member disposed within said internal cavity and structurally reinforcing said external member, wherein said internal member is readily accessible through said opening, wherein said first side protrusion and said second side protrusion abut said internal member to at least partially position said internal member within said internal cavity, wherein said internal member includes a longitudinally extending lateral member including a first side situated upon said first side protrusion, a second side opposite from said first side and situated upon said second side protrusion, and a midspan interposed between said first side and said second side and accessible through said opening, a longitudinally extending first upright member extending upward from said lateral member to a position proximate to said first upper protrusion, and a longitudinally extending second upright member extending upward from said lateral member to a position proximate to said second upper protrusion, and wherein said internal member is constructed of a second material that is distinct from said first material and has a second hardness that is less than said first hardness, whereby said internal member is distinct from said external member, a cover sheet extending through said opening and at least partially disposed within said internal cavity; and a plurality of piercing members disposed at least partially within said internal cavity and connecting said cover sheet to said internal member.

* * * * *